United States Patent
Zhang (10) Patent No.: US 11,079,299 B2
(45) Date of Patent: Aug. 3, 2021

(54) TERMINAL WATER-ENTRY PROTECTION METHOD AND ELECTRONIC DEVICE

(71) Applicant: SHENZHEN GOODIX TECHNOLOGY CO., LTD., Guangdong (CN)

(72) Inventor: Ping Zhang, Guangdong (CN)

(73) Assignee: SHENZHEN GOODIX TECHNOLOGY CO., LTD

(*) Notice: Subject to any disclaimer, the term of this patent is extended or adjusted under 35 U.S.C. 154(b) by 379 days.

(21) Appl. No.: 15/879,704

(22) Filed: Jan. 25, 2018

(65) Prior Publication Data
US 2018/0149548 A1 May 31, 2018

Related U.S. Application Data

(63) Continuation of application No. PCT/CN2016/104520, filed on Nov. 4, 2016.

(51) Int. Cl.
*G01M 3/16* (2006.01)
*G06F 1/3206* (2019.01)
(Continued)

(52) U.S. Cl.
CPC .......... *G01M 3/16* (2013.01); *G01F 23/266* (2013.01); *G01N 27/223* (2013.01);
(Continued)

(58) Field of Classification Search
CPC .......... G01M 3/16; G01M 3/04; G06F 3/041; G06F 3/044; G01F 23/266; G01N 27/223;
(Continued)

(56) References Cited

U.S. PATENT DOCUMENTS

2012/0050214 A1* 3/2012 Kremin .................. G06F 3/044
  345/174
2014/0092033 A1* 4/2014 Chang .................... G06F 3/044
  345/173
(Continued)

FOREIGN PATENT DOCUMENTS

CN     103366138 A    10/2013
CN     103376963 A    10/2013
(Continued)

OTHER PUBLICATIONS

State Intellectual Property Office of the P.R. China (ISR/CN), "International Search Report for PCT/CN2016/104520", China, dated Aug. 3, 2017.
(Continued)

*Primary Examiner* — Jeff W Natalini (57) ABSTRACT

The present disclosure relates to a terminal water-entry protection method and an electronic device. The method includes: arranging at least one start region in a touch region of a touch screen of a terminal, where at least one node is included in the start region; acquiring a trigger value of each node in the at least one start region, and acquiring a marker value of each node in the whole touch screen if the trigger value of at least one node in the at least one start region reaches a predetermined trigger threshold; increasing the number of nodes in a water-entry region by one when the marker value of any node in the whole touch screen reaches a predetermined marker threshold; judging whether the number of nodes in the water-entry region reaches a predetermined value; and controlling a power source of the terminal according to a judgment result.

17 Claims, 9 Drawing Sheets

(51) Int. Cl.
*G01F 23/26* (2006.01)
*G01N 27/22* (2006.01)
*G08B 21/20* (2006.01)
*G05B 19/042* (2006.01)

(52) U.S. Cl.
CPC ............ *G06F 1/3206* (2013.01); *G08B 21/20* (2013.01); *G05B 19/0428* (2013.01); *G05B 2219/23161* (2013.01)

(58) Field of Classification Search
CPC .......... G08B 21/20; G05B 2219/23161; G05B 19/0428; H04M 1/72569; H04M 1/72577; H04M 2201/34; H04M 2250/22
See application file for complete search history.

(56) References Cited

U.S. PATENT DOCUMENTS

| | | | |
|---|---|---|---|
| 2014/0298064 A1 | 10/2014 | Lin | |
| 2014/0327991 A1* | 11/2014 | Chung | H02H 5/083 361/18 |
| 2016/0334294 A1* | 11/2016 | Ueno | G01L 19/086 |
| 2018/0275824 A1* | 9/2018 | Li | G06F 3/03547 |

FOREIGN PATENT DOCUMENTS

| | | | | |
|---|---|---|---|---|
| CN | 3057292 | * | 6/2014 | ............. H04M 1/02 |
| CN | 103970350 | A | 8/2014 | |
| CN | 105100486 | A | 11/2015 | |
| EP | 2079011 | A1 | 7/2009 | |
| EP | 3057292 | A1 | 8/2016 | |
| JP | 2006235720 | A | 9/2006 | |
| JP | 2016170520 | A | 9/2016 | |

OTHER PUBLICATIONS

Chinese Office Action in Chinese Application No. 201680001496.1 dated Aug. 26, 2020, 8 pages.
India Office Action in India Application No. 201837003721 dated Sep. 16, 2020, 6 pages.

* cited by examiner

|    | 1  | 2  | 3  | 4  | 5  | 6  | 7  | 8  | 9  | 10 | 11 | 12 | 13 | 14 | 15 | 16 |
|----|----|----|----|----|----|----|----|----|----|----|----|----|----|----|----|----|
| 1  | -2 | -6 | 0  | -3 | -1 | 1  | 0  | -3 | -2 | -3 | 1  | 0  | 1  | 1  | 0  | -1 |
| 2  | -3 | 0  | -4 | 0  | 2  | 1  | -3 | -1 | 1  | 0  | 2  | -5 | 2  | 1  | 0  | -1 |
| 3  | -3 | 0  | 1  | 2  | -3 | -4 | -2 | 0  | 1  | -2 | 1  | 0  | 0  | -3 | -5 | 1  |
| 4  | -3 | 1  | -1 | 0  | -3 | -1 | 1  | 1  | 2  | 3  | -3 | -4 | 2  | 1  | -3 | 5  |
| 5  | -7 | -3 | 4  | 2  | -3 | -1 | 2  | 0  | 1  | 1  | -7 | 5  | -3 | -1 | 2  | -3 |
| 6  | -1 | -3 | 2  | -3 | -2 | -4 | 1  | 0  | 4  | -8 | 5  | -3 | -4 | -3 | 1  | -6 |
| 7  | -3 | 1  | 1  | -2 | -1 | 0  | 4  | 2  | -2 | 4  | 2  | -1 | 2  | 1  | 3  | 9  |
| 8  | 3  | -4 | 1  | -3 | 4  | 1  | 0  | -3 | -4 | 1  | 1  | 5  | 1  | 2  | 4  | 3  |
| 9  | 2  | -1 | -2 | 4  | 1  | 4  | -3 | 2  | 0  | 1  | -3 | -1 | 1  | 4  | 3  | 2  |
| 10 | 0  | -5 | 0  | 2  | -3 | -4 | 1  | 2  | 4  | -3 | -3 | -1 | 2  | 1  | 1  | 4  |
| 11 | -1 | -1 | 0  | -1 | 1  | -4 | -3 | -1 | -1 | 1  | -1 | 5  | 1  | -3 | 3  | 2  |
| 12 | -2 | -6 | -3 | 3  | -2 | 2  | -4 | -3 | 0  | -6 | -6 | 4  | 1  | -3 | 5  | -1 |
| 13 | 0  | -3 | 2  | 2  | -1 | -3 | -7 | 6  | -2 | (-9)| 3 | -3 | 0  | -2 | -3 | 4  |
| 14 | -4 | -1 | 1  | 3  | -3 | -1 | 6  | 2  | -2 | 2  | -1 | 0  | 0  | 1  | 5  | 2  |
| 15 | -2 | 0  | 2  | -3 | 1  | 2  | 4  | -3 | -1 | 4  | 0  | 3  | 3  | 0  | -5 | 5  |
| 16 | 6  | 0  | -3 | 1  | 1  | 0  | 0  | -1 | 3  | 2  | 2  | 2  | -1 | 5  | 2  | 6  |
| 17 | -1 | -1 | -2 | 2  | -2 | 1  | 1  | 2  | 4  | -3 | 5  | 1  | -1 | -3 | 4  | 7  |
| 18 | 1  | -1 | 0  | 0  | 1  | -3 | 2  | 4  | 2  | 5  | 4  | 0  | 2  | -5 | 4  | 6  |
| 19 | 3  | 3  | 1  | 1  | 2  | -5 | 0  | 6  | 1  | 0  | 1  | 1  | 0  | 8  | 2  | 5  |
| 20 | 2  | 1  | 3  | 3  | -4 | 2  | 0  | 4  | 8  | 2  | 4  | 1  | 1  | 2  | -3 | 4  |
| 21 | 8  | 1  | 6  | 2  | 3  | 3  | -3 | 3  | 2  | 4  | 1  | 1  | 0  | 3  | -1 | (18)|
| 22 | 6  | 1  | 2  | -3 | 6  | 4  | -4 | 0  | 4  | 9  | 3  | -3 | 3  | 1  | -2 | 3  |
| 23 | 5  | 3  | 1  | 1  | 4  | 2  | 0  | 6  | -3 | 5  | 4  | -2 | -2 | 2  | 5  | 2  |
| 24 | 6  | 1  | -3 | 3  | 2  | 7  | -2 | 2  | -4 | 7  | 2  | 1  | 1  | 2  | 4  | 4  |
| 25 | 4  | 1  | 1  | 2  | 4  | 2  | 4  | 4  | 5  | -3 | 6  | 4  | 2  | -3 | 8  | 2  |
| 26 | 6  | 3  | 4  | 6  | 5  | 3  | 5  | 8  | 7  | -1 | 3  | 3  | 2  | 5  | 2  | 5  |
| 27 | 3  | -3 | 3  | 4  | 7  | 6  | 3  | 2  | 3  | 2  | 2  | -3 | 1  | 4  | 1  | 8  |
| 28 | 6  | 3  | 2  | 5  | 3  | 5  | 7  | 3  | 6  | 4  | 4  | 2  | 6  | 8  | 5  | 15 |
| 29 | 7  | 1  | 6  | 5  | 6  | 8  | 9  | 8  | 5  | 7  | 5  | 4  | 3  | 3  | 4  | 9  |

FIG. 1

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | -1  | -2  | 1   | -3  | -3  | -4  | 1   | 2   | 4   | -3  | -3  | -1  | 2   | 1   | 1   | 4   |
| 2  | -3  | 0   | -4  | 0   | 2   | 1   | -3  | -1  | 1   | 0   | 2   | -5  | 2   | 1   | 0   | 3   |
| 3  | -3  | 0   | 1   | 2   | -3  | -4  | -2  | 0   | 1   | -2  | 1   | 0   | 0   | -3  | -5  | -1  |
| 4  | -3  | 1   | -1  | 0   | -3  | -1  | 1   | 1   | 2   | 3   | -3  | -4  | 2   | 1   | -3  | 15  |
| 5  | -1  | -3  | 4   | 2   | -3  | -1  | 2   | 0   | 1   | 1   | -7  | 5   | -3  | -1  | 2   | -3  |
| 6  | -1  | -3  | 2   | -3  | -2  | -4  | 1   | 0   | 4   | -8  | 5   | -3  | -4  | -3  | 1   | -6  |
| 7  | -3  | 1   | 1   | -2  | -1  | 0   | 4   | 2   | -2  | 4   | 2   | -1  | 2   | 1   | 3   | 2   |
| 8  | 3   | -4  | 1   | -3  | 4   | 1   | 0   | -3  | -4  | 1   | 1   | 5   | 1   | 2   | 4   | 14  |
| 9  | 2   | -1  | -2  | 4   | 1   | 4   | -3  | 2   | 0   | 1   | -3  | -1  | 1   | 4   | 3   | 9   |
| 10 | 0   | -5  | 0   | 2   | -3  | -1  | 1   | 2   | 4   | -3  | -3  | -1  | 2   | 1   | 1   | 2   |
| 11 | -1  | -1  | 0   | -1  | 1   | -4  | -3  | -1  | -1  | 1   | -1  | 5   | 1   | -3  | 3   | 8   |
| 12 | -2  | -6  | -3  | 3   | -2  | 2   | -4  | -3  | 0   | -6  | -6  | 4   | 1   | -3  | 5   | -1  |
| 13 | 0   | -3  | 2   | 2   | -1  | -3  | -7  | 6   | -2  | -9  | 3   | -3  | 0   | -2  | -3  | -4  |
| 14 | -4  | -1  | 1   | 3   | -3  | -1  | 6   | 2   | -2  | 2   | -1  | 0   | 0   | 1   | 5   | 5   |
| 15 | -2  | 0   | 2   | -3  | 1   | 2   | 4   | -3  | -1  | 4   | 0   | 3   | 3   | 0   | -5  | 2   |
| 16 | 6   | 0   | -3  | 1   | 1   | 0   | 0   | -1  | 3   | 2   | 2   | 2   | -1  | 5   | 2   | 5   |
| 17 | 16  | -1  | -2  | 2   | -2  | 1   | 1   | 2   | 4   | -3  | 5   | 1   | -1  | -3  | 4   | 6   |
| 18 | 15  | -1  | 0   | 0   | 1   | -3  | 2   | 4   | 2   | 5   | 4   | 0   | 2   | -5  | 4   | 4   |
| 19 | 11  | 3   | 1   | 1   | 2   | -5  | 0   | 6   | 1   | 0   | 1   | 1   | 0   | 8   | 2   | 6   |
| 20 | 8   | 1   | 3   | 3   | -4  | 2   | 0   | 4   | 8   | 2   | 4   | 1   | 1   | 2   | -3  | 7   |
| 21 | 9   | 1   | 6   | 2   | 3   | 3   | -3  | 3   | 2   | 4   | 1   | 1   | 0   | 3   | -1  | 15  |
| 22 | 8   | 1   | 2   | -3  | 6   | 4   | -4  | 0   | 4   | 9   | 3   | -3  | 3   | 1   | -2  | 16  |
| 23 | 8   | 3   | 1   | 1   | 4   | 2   | 0   | 6   | -3  | 5   | 4   | -2  | -2  | 2   | 5   | 7   |
| 24 | 11  | 1   | -3  | 3   | 2   | 7   | -2  | 2   | -4  | 7   | 2   | 1   | 1   | 2   | 4   | 5   |
| 25 | 26  | 1   | 1   | 2   | 4   | 2   | 4   | 4   | 5   | -3  | 6   | 4   | 2   | -3  | 8   | 3   |
| 26 | 51  | 3   | 4   | 6   | 5   | 3   | 5   | 8   | 7   | -1  | 3   | 3   | 2   | 5   | 2   | 8   |
| 27 | 79  | -3  | 3   | 4   | 7   | 6   | 3   | 2   | 3   | 2   | 2   | -3  | 1   | 4   | 1   | 2   |
| 28 | 119 | 3   | 2   | 5   | 3   | 5   | 7   | 3   | 6   | 4   | 4   | 2   | 6   | 8   | 5   | 17  |
| 29 | 162 | 54  | 11  | 5   | 6   | 8   | 8   | 6   | -1  | 5   | 4   | 3   | 2   | 4   | 2   | 7   |

FIG. 2

|    | 1   | 2   | 3  | 4  | 5  | 6  | 7  | 8  | 9  | 10 | 11 | 12 | 13 | 14 | 15 | 16 |
|----|-----|-----|----|----|----|----|----|----|----|----|----|----|----|----|----|----|
| 1  | 1   | -3  | 1  | -3 | -2 | -1 | 0  | -1 | 3  | -2 | -5 | -1 | 4  | 2  | 1  | 3  |
| 2  | -3  | 0   | -4 | 0  | 2  | 1  | -3 | -1 | 1  | 0  | 2  | -5 | 2  | 1  | 0  | 3  |
| 3  | -3  | 0   | 1  | 2  | -3 | -4 | -2 | 0  | 1  | -2 | 1  | 0  | 0  | -3 | -5 | -1 |
| 4  | -3  | 1   | -1 | 0  | -3 | -1 | 1  | 1  | 2  | 3  | -3 | -4 | 2  | 1  | -3 | 15 |
| 5  | -1  | -3  | 4  | 2  | -3 | -1 | 2  | 0  | 1  | 1  | -7 | 5  | -3 | -1 | 2  | -3 |
| 6  | -1  | -3  | 2  | -3 | -2 | -4 | 1  | 0  | 4  | -8 | 5  | -3 | -4 | -3 | 1  | -6 |
| 7  | -3  | 1   | 1  | -2 | -1 | 0  | 4  | 2  | -2 | 4  | 2  | -1 | 2  | 1  | 3  | 2  |
| 8  | 3   | -4  | 1  | -3 | 4  | 1  | 0  | -3 | -4 | 1  | 1  | 5  | 1  | 2  | 4  | 10 |
| 9  | 2   | -1  | -2 | 4  | 1  | 4  | -3 | 2  | 0  | 1  | -3 | -1 | 1  | 4  | 3  | 5  |
| 10 | 1   | -5  | 0  | 2  | -3 | -1 | 1  | 2  | 4  | -3 | -3 | -1 | 2  | 1  | 1  | 5  |
| 11 | 6   | -1  | 0  | -1 | 1  | -4 | -3 | -1 | -1 | 1  | -1 | 5  | 1  | -3 | 3  | 8  |
| 12 | 4   | -6  | -3 | 3  | -2 | 2  | -4 | -3 | 0  | -6 | -6 | 4  | 1  | -3 | 5  | 14 |
| 13 | 8   | -3  | 2  | 2  | -1 | -3 | -7 | 6  | -2 | -9 | 3  | -3 | 0  | -2 | -3 | 10 |
| 14 | 11  | -1  | 1  | 3  | -3 | -1 | 6  | 2  | -2 | 2  | -1 | 0  | 0  | 1  | 5  | 13 |
| 15 | 15  | 0   | 2  | -3 | 1  | 2  | 4  | -3 | -1 | 4  | 0  | 3  | 3  | 0  | -5 | 19 |
| 16 | 25  | 0   | -3 | 1  | 1  | 0  | 0  | -1 | 3  | 2  | 2  | 2  | -1 | 5  | 2  | 45 |
| 17 | 40  | 7   | 10 | 2  | -2 | 1  | 1  | 2  | 4  | -3 | 5  | 1  | -1 | -3 | 4  | 31 |
| 18 | 82  | 14  | 7  | 0  | 1  | -3 | 4  | 4  | 2  | 5  | 4  | 0  | 2  | -5 | 4  | 4  |
| 19 | 137 | 37  | 8  | 1  | 2  | -5 | 2  | 6  | 1  | 0  | 1  | 1  | 0  | 8  | 2  | 6  |
| 20 | 182 | 68  | 6  | 3  | -4 | 2  | 1  | 5  | 8  | 2  | 4  | 1  | 1  | 2  | -3 | 7  |
| 21 | 199 | 36  | 5  | 1  | 1  | 3  | 1  | 5  | 2  | 1  | 1  | 1  | 0  | 3  | -1 | 15 |
| 22 | 200 | 63  | 0  | 1  | 2  | 4  | 3  | 2  | 4  | 2  | 2  | -3 | 2  | 1  | -2 | 19 |
| 23 | 183 | 7   | 5  | 6  | 4  | 2  | 7  | 7  | 2  | 2  | 2  | -2 | 2  | 2  | 5  | 12 |
| 24 | 75  | 17  | 6  | 7  | 3  | 7  | 5  | 5  | 2  | 1  | 3  | 3  | 4  | 8  | 4  | 28 |
| 25 | 103 | 49  | 18 | 15 | 8  | 2  | 5  | 10 | 3  | 3  | 2  | 5  | 7  | 11 | 12 | 69 |
| 26 | 202 | 173 | 62 | 47 | 26 | 11 | 6  | 10 | 11 | 7  | 6  | 7  | 7  | 8  | 10 | 45 |
| 27 | 227 | 228 | 225| 198| 137| 29 | 23 | 24 | 19 | 14 | 13 | 15 | 16 | 11 | 13 | 24 |
| 28 | 246 | 252 | 254| 239| 224| 150| 126| 119| 91 | 60 | 48 | 50 | 39 | 29 | 30 | 38 |
| 29 | 263 | 242 | 238| 230| 225| 234| 216| 215| 204| 190| 193| 188| 168| 143| 144| 149|

FIG. 3

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | 0   | 1   | -2  | -5  | -6  | -1  | 6   | 3   | -1  | -1  | -2  | 1   | -5  | -2  | -2  | 3   |
| 2  | -2  | 0   | 1   | 0   | 5   | 0   | 4   | 0   | 0   | 0   | -1  | 3   | -3  | 1   | -1  | 7   |
| 3  | 2   | 0   | 4   | 3   | 0   | 0   | 1   | 0   | -1  | -5  | -2  | -1  | 0   | 0   | 1   | 3   |
| 4  | 1   | 7   | 2   | 1   | -1  | 0   | 2   | 0   | 1   | -2  | 1   | 1   | -4  | 1   | 0   | 7   |
| 5  | -1  | 2   | -1  | 3   | 0   | 0   | -2  | 0   | 3   | 4   | 3   | 5   | -4  | 0   | 5   | 5   |
| 6  | 2   | 3   | 1   | 1   | 1   | 3   | 1   | 0   | 1   | 2   | 3   | -3  | -2  | 2   | 8   | 25  |
| 7  | 5   | 7   | 2   | 2   | 3   | 2   | 4   | 2   | -1  | 3   | 3   | -1  | 1   | 3   | 12  | 84  |
| 8  | 5   | 9   | 4   | 1   | 2   | 1   | 0   | -3  | 1   | 1   | 1   | 5   | 3   | 4   | 15  | 143 |
| 9  | 3   | -1  | 6   | 4   | 3   | 3   | 2   | 2   | 1   | 0   | -3  | 3   | 2   | 5   | 39  | 152 |
| 10 | 6   | 3   | 10  | 10  | 6   | 2   | 2   | 2   | 4   | 2   | -3  | 2   | 7   | 8   | 121 | 206 |
| 11 | 8   | -1  | 18  | 7   | 7   | 3   | 1   | -1  | -1  | 3   | -1  | 7   | 20  | 9   | 228 | 232 |
| 12 | 11  | 14  | 23  | 12  | 11  | 6   | 4   | -3  | 0   | 6   | -6  | 9   | 27  | 12  | 242 | 233 |
| 13 | 26  | 51  | 52  | 21  | 13  | 7   | 6   | 6   | -2  | 10  | 3   | 10  | 48  | 14  | 192 | 233 |
| 14 | 124 | 105 | 118 | 27  | 14  | 11  | 11  | 2   | -2  | 9   | -1  | 12  | 29  | 10  | 53  | 228 |
| 15 | 199 | 164 | 195 | 33  | 13  | 13  | 11  | -3  | 9   | 10  | 0   | 13  | 10  | 11  | 14  | 127 |
| 16 | 216 | 224 | 230 | 56  | 17  | 14  | 9   | 10  | 9   | 8   | 2   | 59  | 7   | 11  | 12  | 27  |
| 17 | 217 | 247 | 245 | 80  | 19  | 13  | 13  | 6   | 9   | 4   | 9   | 9   | 5   | 6   | 11  | 26  |
| 18 | 219 | 245 | 250 | 100 | 21  | 17  | 7   | 11  | 8   | 6   | 4   | 8   | 3   | 11  | 7   | 62  |
| 19 | 228 | 253 | 250 | 83  | 24  | 19  | 15  | 11  | 14  | 8   | 12  | 6   | 14  | 16  | 5   | 199 |
| 20 | 225 | 248 | 194 | 47  | 18  | 21  | 15  | 12  | 11  | 12  | 13  | 13  | 10  | 12  | 71  | 214 |
| 21 | 163 | 146 | 56  | 17  | 12  | 16  | 13  | 10  | 8   | 10  | 12  | 7   | 5   | 4   | 19  | 99  |
| 22 | 54  | 32  | 20  | 10  | 20  | 8   | 22  | 9   | 2   | 3   | 4   | 0   | 0   | 4   | 7   | 22  |
| 23 | 162 | 125 | 55  | 43  | 113 | 24  | 94  | 36  | 15  | 10  | 10  | 8   | 7   | 10  | 21  | 51  |
| 24 | 236 | 248 | 190 | 172 | 241 | 149 | 237 | 109 | 30  | 20  | 23  | 25  | 24  | 19  | 88  | 195 |
| 25 | 240 | 254 | 258 | 254 | 251 | 246 | 255 | 164 | 41  | 33  | 32  | 29  | 37  | 28  | 164 | 223 |
| 26 | 250 | 264 | 267 | 263 | 258 | 254 | 258 | 189 | 134 | 97  | 82  | 76  | 75  | 62  | 159 | 222 |
| 27 | 257 | 260 | 263 | 254 | 256 | 256 | 257 | 256 | 251 | 248 | 246 | 243 | 236 | 236 | 224 | 175 |
| 28 | 267 | 269 | 264 | 253 | 256 | 259 | 253 | 253 | 260 | 255 | 259 | 259 | 263 | 259 | 258 | 230 |
| 29 | 273 | 244 | 241 | 229 | 226 | 235 | 218 | 216 | 216 | 214 | 214 | 216 | 221 | 215 | 220 | 188 |

FIG. 4

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | 2   | -1  | 4   | 1   | 3   | 3   | 7   | 4   | 6   | 3   | 3   | 5   | -1  | 3   | 7   | 5   |
| 2  | 7   | 4   | 1   | 3   | 2   | 5   | 6   | 0   | 4   | 7   | 7   | 6   | 4   | 6   | 5   | 12  |
| 3  | 8   | 5   | 7   | 5   | 3   | 5   | 8   | 4   | 3   | 4   | 4   | 6   | 5   | 7   | 12  | 31  |
| 4  | 10  | 10  | 2   | 10  | 3   | 5   | 7   | 7   | 7   | 6   | 10  | 8   | 8   | 10  | 25  | 160 |
| 5  | 14  | 7   | 6   | 11  | 5   | 8   | 7   | 11  | 8   | 7   | 5   | 9   | 9   | 14  | 99  | 244 |
| 6  | 12  | 11  | 11  | 11  | 10  | 7   | 7   | 8   | 10  | 7   | 13  | 8   | 13  | 32  | 210 | 261 |
| 7  | 41  | 23  | 10  | 12  | 12  | 9   | 9   | 11  | 10  | 11  | 12  | 16  | 18  | 74  | 273 | 257 |
| 8  | 201 | 138 | 42  | 14  | 14  | 13  | 11  | 14  | 9   | 11  | 16  | 17  | 28  | 166 | 285 | 252 |
| 9  | 236 | 266 | 185 | 51  | 21  | 20  | 16  | 16  | 16  | 16  | 16  | 23  | 90  | 263 | 280 | 250 |
| 10 | 232 | 273 | 276 | 210 | 77  | 28  | 20  | 19  | 19  | 17  | 28  | 85  | 246 | 290 | 284 | 254 |
| 11 | 228 | 263 | 271 | 273 | 245 | 99  | 34  | 25  | 22  | 31  | 66  | 231 | 286 | 288 | 285 | 247 |
| 12 | 227 | 265 | 268 | 272 | 271 | 254 | 122 | 42  | 23  | 78  | 195 | 287 | 287 | 285 | 287 | 247 |
| 13 | 231 | 265 | 270 | 271 | 274 | 273 | 265 | 151 | 95  | 251 | 278 | 284 | 284 | 289 | 280 | 250 |
| 14 | 227 | 261 | 266 | 268 | 268 | 272 | 275 | 274 | 201 | 269 | 281 | 284 | 279 | 280 | 278 | 253 |
| 15 | 228 | 259 | 261 | 262 | 267 | 273 | 278 | 280 | 277 | 273 | 280 | 281 | 278 | 281 | 278 | 250 |
| 16 | 233 | 258 | 259 | 263 | 265 | 268 | 275 | 273 | 274 | 275 | 281 | 273 | 275 | 281 | 276 | 253 |
| 17 | 236 | 259 | 261 | 265 | 264 | 268 | 276 | 278 | 277 | 276 | 275 | 278 | 276 | 282 | 280 | 254 |
| 18 | 235 | 264 | 263 | 264 | 268 | 269 | 269 | 276 | 271 | 273 | 275 | 276 | 277 | 280 | 275 | 255 |
| 19 | 246 | 271 | 270 | 268 | 269 | 275 | 273 | 273 | 274 | 276 | 276 | 276 | 280 | 284 | 285 | 256 |
| 20 | 249 | 269 | 272 | 268 | 272 | 270 | 269 | 269 | 268 | 271 | 275 | 275 | 276 | 278 | 279 | 250 |
| 21 | 252 | 274 | 277 | 274 | 270 | 267 | 265 | 270 | 269 | 266 | 272 | 271 | 275 | 278 | 274 | 253 |
| 22 | 256 | 274 | 277 | 277 | 273 | 277 | 275 | 268 | 265 | 272 | 274 | 271 | 275 | 277 | 275 | 249 |
| 23 | 256 | 276 | 278 | 276 | 271 | 271 | 270 | 268 | 266 | 266 | 267 | 269 | 272 | 273 | 278 | 247 |
| 24 | 258 | 276 | 277 | 271 | 273 | 270 | 268 | 269 | 263 | 263 | 267 | 266 | 268 | 271 | 269 | 244 |
| 25 | 256 | 272 | 274 | 277 | 270 | 271 | 272 | 267 | 260 | 259 | 267 | 264 | 263 | 264 | 268 | 240 |
| 26 | 265 | 274 | 277 | 278 | 276 | 275 | 269 | 271 | 267 | 263 | 264 | 263 | 271 | 269 | 271 | 237 |
| 27 | 263 | 265 | 273 | 261 | 269 | 273 | 271 | 264 | 263 | 264 | 269 | 263 | 268 | 265 | 264 | 241 |
| 28 | 273 | 271 | 270 | 259 | 263 | 269 | 265 | 260 | 260 | 260 | 265 | 265 | 265 | 265 | 266 | 237 |
| 29 | 281 | 248 | 247 | 235 | 234 | 232 | 224 | 219 | 219 | 218 | 219 | 218 | 217 | 220 | 222 | 190 |

|    | 1   | 2  | 3  | 4   | 5  | 6  | 7  | 8  | 9  | 10  | 11  | 12 | 13  | 14  | 15  | 16  |
|----|-----|----|----|-----|----|----|----|----|----|-----|-----|----|-----|-----|-----|-----|
| 1  | 3   | 2  | 1  | 2   | -5 | 1  | 2  | 1  | 1  | 3   | -4  | 7  | 2   | 6   | 8   | 4   |
| 2  | -2  | 1  | -1 | 2   | 2  | 5  | 6  | -3 | -1 | 3   | -1  | 6  | 5   | 1   | 11  | -3  |
| 3  | -2  | 2  | 2  | 7   | 4  | 3  | 3  | 0  | -2 | 6   | -4  | 4  | 4   | 6   | -5  | 0   |
| 4  | 3   | 10 | -1 | 5   | -3 | 1  | 1  | 1  | 0  | 5   | 0   | 5  | 5   | 5   | 8   | -10 |
| 5  | 1-1 | -1 | 4  | 8   | 1  | 0  | 2  | 4  | 1  | 3   | -1  | 4  | 2   | 3   | 5   | 2   |
| 6  | 6   | 2  | -3 | 2   | -3 | -2 | -2 | 0  | 1  | 7   | 3   | 8  | 4   | 1   | 5   | 3   |
| 7  | 10  | 3  | -3 | 5   | 4  | 4  | 1  | 0  | 1  | 10  | 10  | 12 | 5   | 2   | 7   | 2   |
| 8  | 15  | 3  | 2  | 4   | 4  | 3  | 0  | 2  | 9  | 24  | 13  | 11 | 6   | 7   | 5   | 4   |
| 9  | 9   | 2  | 3  | 3   | -2 | 9  | 7  | 11 | 55 | 159 | 60  | 13 | 16  | 10  | 13  | 8   |
| 10 | 7   | 11 | 7  | 15  | 11 | 15 | 10 | 20 | 148| 281 | 119 | 25 | 32  | 85  | 38  | 24  |
| 11 | 12  | 12 | 17 | 26  | 35 | 26 | 25 | 34 | 186| 281 | 94  | 33 | 138 | 264 | 250 | 52  |
| 12 | 12  | 13 | 23 | 101 | 164| 66 | 29 | 42 | 201| 267 | 66  | 46 | 242 | 278 | 257 | 63  |
| 13 | 17  | 23 | 38 | 208 | 268| 106| 30 | 42 | 181| 232 | 57  | 43 | 212 | 274 | 256 | 61  |
| 14 | 19  | 24 | 55 | 237 | 261| 94 | 36 | 51 | 189| 222 | 57  | 61 | 230 | 268 | 281 | 104 |
| 15 | 17  | 25 | 77 | 247 | 241| 70 | 37 | 49 | 196| 214 | 37  | 54 | 246 | 270 | 259 | 87  |
| 16 | 23  | 30 | 98 | 248 | 203| 48 | 28 | 42 | 119| 104 | 16  | 37 | 177 | 262 | 255 | 83  |
| 17 | 15  | 26 | 111| 251 | 170| 36 | 23 | 31 | 43 | 45  | 46  | 7  | 84  | 258 | 200 | 55  |
| 18 | 12  | 20 | 87 | 220 | 134| 34 | 21 | 24 | 28 | 31  | 33  | -2 | 44  | 224 | 142 | 28  |
| 19 | 11  | 16 | 33 | 92  | 52 | 23 | 15 | 17 | 21 | 24  | 16  | 11 | 33  | 176 | 156 | 24  |
| 20 | 1   | 11 | 16 | 39  | 20 | 16 | 9  | 8  | 12 | 18  | 11  | 15 | 22  | 66  | 67  | 9   |
| 21 | 2   | 7  | 11 | 21  | 9  | 5  | 7  | 9  | 10 | -2  | 15  | 10 | 10  | 15  | 20  | 6   |
| 22 | 1   | 6  | 7  | 13  | 8  | 12 | 11 | 3  | 3  | 10  | 10  | 8  | 9   | 16  | 38  | -14 |
| 23 | 4   | 6  | 10 | 16  | 5  | 6  | 7  | 6  | 7  | 16  | 8   | 6  | 10  | 8   | -1  | 27  |
| 24 | 1   | 1  | 5  | 9   | 6  | 4  | 4  | 4  | -3 | 15  | 6   | 5  | 7   | 10  | 8   | 7   |
| 25 | 3   | 5  | 6  | 12  | 6  | 4  | 5  | 5  | 5  | -7  | 5   | 6  | 8   | 8   | 9   | 4   |
| 26 | 9   | 5  | 4  | 9   | 2  | 4  | 2  | 8  | 15 | -2  | 6   | 4  | 5   | 8   | 5   | 1   |
| 27 | 5   | -1 | 2  | 8   | 3  | 4  | 7  | 3  | 7  | -8  | 4   | 3  | 6   | 3   | 4   | 4   |
| 28 | 4   | 1  | 1  | 6   | -1 | 4  | 1  | -1 | -6 | 23  | 3   | 3  | 5   | 5   | 1   | 1   |
| 29 | -3  | 3  | 4  | 5   | 4  | 6  | 4  | 11 | 20 | 18  | 6   | 6  | 5   | 7   | 11  | 2   |

TERMINAL WATER-ENTRY PROTECTION METHOD AND ELECTRONIC DEVICE

CROSS-REFERENCE TO RELATED APPLICATIONS

The present application is a continuation of international application No. PCT/CN2016/104520, filed on Nov. 4, 2016, which is incorporated herein by reference in its entirety.

TECHNICAL FIELD

Technical solutions of the present disclosure relate to the technical field of electronics, and in particular, relate to a terminal water-entry protection method and an electronic device.

BACKGROUND

When smart phones, tablet computers and the like terminals fall into water, the water flow may enter the interior of the terminals. As such, the circuit is shorted, and devices and elements inside the terminals are damaged, which is always a challenge in the industry and among users.

During practice of the present disclosure, the inventors have identified that in the prior art, damage caused by water-entry is mitigated mainly by configuring a water-entry protection circuit and cutting off the power source of the terminal when water enters interior of the terminal This method may have the following defect: The water-entry protection circuit generally works effectively only after water has entered interior of the terminal; however, in this case, the devices or elements inside the terminal may be damaged due to a short circuit caused by entered water, and thus the water-entry protection circuit achieves a very limited effect.

Therefore, the terminal may not cut off the power source of the entire terminal before entry into water, which may be a technical problem to be urgently solved.

SUMMARY

The technical solutions according to the present disclosure at least solve the following technical problem: A terminal may not cut off the power source thereof before entry into water.

One or more embodiments of the present disclosure provide a terminal water-entry protection method. The method includes: arranging at least one start region in a touch region of a touch screen of a terminal, where at least one node is included in the at least one start region; acquiring a trigger value of each node in the at least one start region, and acquiring a marker value of each node in the whole touch screen if the trigger value of at least one node in the at least one start region reaches a predetermined trigger threshold; increasing the number of nodes in a water-entry region by one when the marker value of any node in the whole touch screen reaches a predetermined marker threshold; judging whether the number of nodes in the water-entry region reaches a predetermined value; and controlling a power source of the terminal according to a judgment result.

In one or more embodiments of the present disclosure, the acquiring a trigger value of each node in the at least one start region includes: using a measurement value of each node in the at least one start region when the touch screen is in the air as a reference value of each node in the at least start region; constantly acquiring measurement value of each node in the at least one start region; and constantly calculating a difference value between the measurement value of each node in the at least one start region and the reference value of each node in the at least one start region, and using the difference value as the trigger value.

In one or more embodiments of the present disclosure, the acquiring a marker value of each node in the whole touch screen includes: using the measurement value of each node in the whole touch screen when the touch screen is in the air as a reference value of each node in the whole touch screen; constantly acquiring a measurement value of each node in the whole touch screen; and constantly calculating a difference value between the measurement value of each node in the whole touch screen and the reference value of each node in the whole touch screen, and using the difference value as the marker value.

In one or more embodiments of the present disclosure, the acquiring a trigger value of each node in the at least one start region includes: constantly acquiring capacitance value or current value of each node in the at least one start region; and processing the capacitance value or current value of each node in the at least one start region to acquire the trigger value of each node in the at least one start region.

In one or more embodiments of the present disclosure, the acquiring a marker value of each node in the whole touch screen includes: constantly acquiring a capacitance value or current value of each node in the whole touch screen; and processing the capacitance value or current value of each node in the whole touch screen to acquire the marker value of each node in the whole touch screen.

In one or more embodiments of the present disclosure, the controlling a power source of the terminal according to a judgment result includes: cutting off the power source of the terminal if the number of nodes in the water-entry region reaches the predetermined value.

In one or more embodiments of the present disclosure, the start region is respectively present in each of touch regions at four corners of the touch screen.

One or more embodiments of the present disclosure provide an electronic device. The electronic device is equipped with a touch screen. A touch region of the touch screen has at least one start region, wherein the at least one start region has at least one node.

The electronic device includes at least one processor and at least one memory; wherein the at least one processor is communicably connected to the at least one memory.

The at least one memory stores instructions executable by the at least one processor, which, when being executed, cause the at least one processor to: acquire a trigger value of each node in at least one start region, and acquire a marker value of each node in the whole touch screen if the trigger value of at least one node in the at least one start region reaches a predetermined trigger threshold; increase the number of nodes in a water-entry region by one if the marker value of any node in the whole touch screen reaches a predetermined marker threshold; judge whether the number of nodes in the water-entry region reaches a predetermined value; and control a power source of the terminal according to a judgment result.

In one or more embodiments of the present disclosure, the at least one processor is further configured to: use a measurement value of each node in the at least one start region when the touch screen is in the air as a reference value of each node in the at least start region; constantly acquire measurement value of each node in the at least one start region; and constantly calculate a difference value between the measurement value of each node in the at least one start region and the reference value of each node in the at least one start region, and use the difference value as the trigger value.

In one or more embodiments of the present disclosure, the at least one processor is further configured to: use the measurement value of each node in the whole touch screen when the touch screen is in the air as a reference value of each node in the whole touch screen; constantly acquire a measurement value of each node in the whole touch screen; and constantly calculate a difference value between the measurement value of each node in the whole touch screen and the reference value of each node in the whole touch screen, and use the difference value as the marker value.

In one or more embodiments of the present disclosure, the at least one processor is further configured to: constantly acquire capacitance value or current value of each node in the at least one start region; and process the capacitance value or current value of each node in the at least one start region to acquire the trigger value of each node in the at least one start region.

In one or more embodiments of the present disclosure, the at least one processor is further configured to: constantly acquire a capacitance value or current value of each node in the whole touch screen; and process the capacitance value or current value of each node in the whole touch screen to acquire the marker value of each node in the whole touch screen.

In one or more embodiments of the present disclosure, the at least one processor is further configured to cut off the power source of the terminal if the number of nodes in the water-entry region reaches the predetermined value.

One or more embodiments of the present disclosure further provide a non-transitory (non-volatile) computer storage medium, wherein the computer storage medium stores computer executable instructions, which may be executed to perform the terminal water-entry protection method in any of the above method embodiments.

As compared with the prior art, the technical solutions according to the present disclosure mainly achieves the following beneficial effects:

In the embodiments of the present disclosure, a touch region of the touch screen of the terminal has at least one start region, wherein the at least one start region has at least one node. Accordingly, water-entry protection may be timely triggered for the terminal. The terminal firstly acquires a trigger value of each node in the at least one start region, and acquires a marker value of each node in the whole touch screen if the trigger value of at least one node in the at least one start region reaches a predetermined trigger threshold. The number of nodes in a water-entry region is increased by one if the marker value of any node in the whole touch screen reaches a predetermined marker threshold. The terminal judges whether the number of nodes in the water-entry region reaches a predetermined value, and controls a power source of the terminal according to a judgment result. Accordingly, according to the embodiments of the present disclosure, the power source of the entire terminal may be cut off before water entry into the interior of the terminal, thereby protecting devices inside the terminal.

BRIEF DESCRIPTION OF THE DRAWINGS

FIGS. 1 to 6 are schematic diagrams of recording difference value variations of a capacitive touch screen before and after water-entry.

DETAILED DESCRIPTION

In order to facilitate understanding of the present disclosure, the present disclosure will be described more comprehensively with reference to relevant drawings. The accompanying drawings show preferred embodiments of the present disclosure. However, the present disclosure may be implemented in a plurality of forms or ways, and is not limited to the embodiments described herein. On the contrary, these embodiments are provided to make the understanding of the disclosed contents of the present disclosure more thorough and comprehensive.

Unless otherwise defined, all the technical and scientific terms used in this specification are the same as those usually understood by persons skilled in the art of the present disclosure. The terms in the specification of the present disclosure are only used to describe the specific embodiments, but not to limit the present disclosure.

During inventors' study on the present disclosure, a water-entry test is performed for such terminals as mobile terminals and the like that are equipped with a touch screen. Teachings derived from the test are briefly described using a capacitive touch screen as an example.

Figure 7:
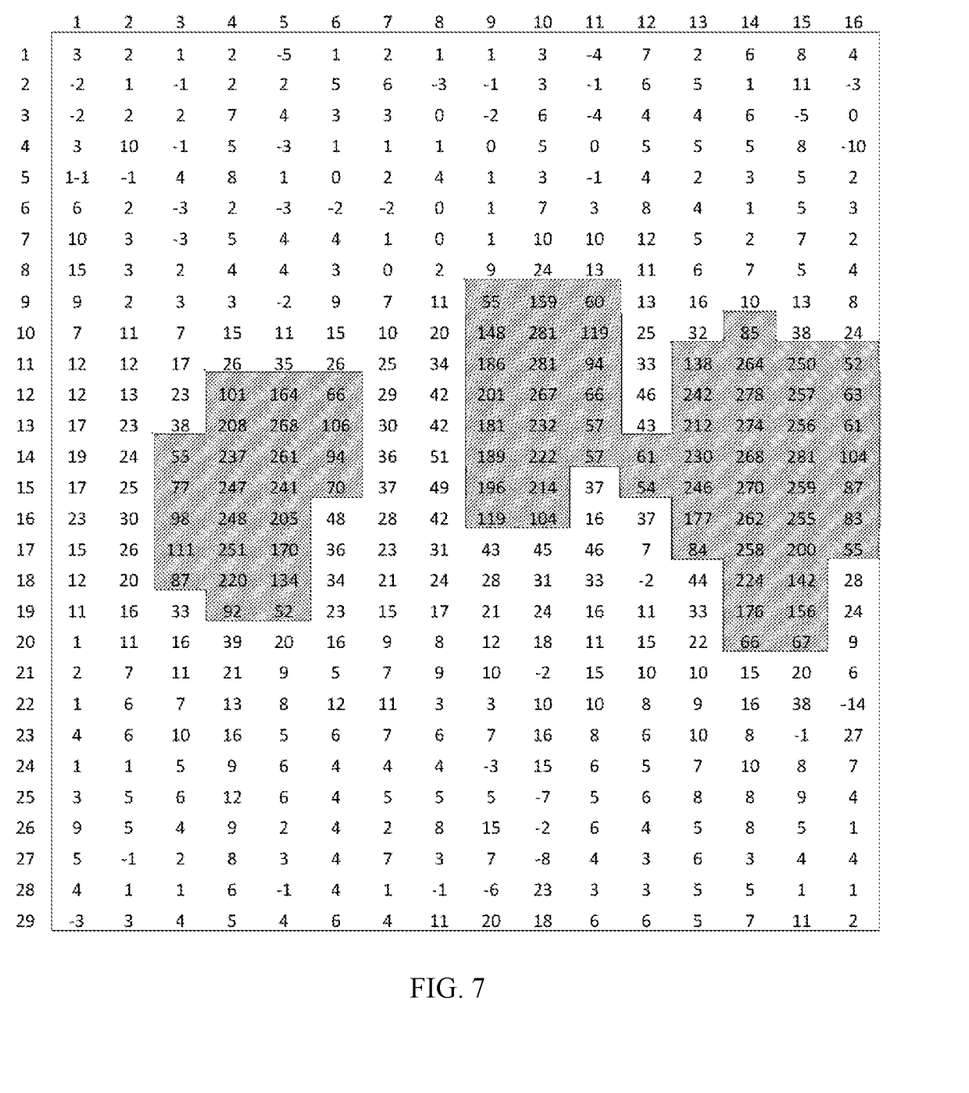
FIG. 7 is a schematic diagram of recording difference value variations of nodes on a capacitive touch screen after contact by a human body.

Water flows that are common in people's daily life generally have an electric field, and in case of contact with the operating capacitive touch screen, the capacitive touch screen is capable of sensing a contact point with a water flow, which is similar to the effect of human body's touch on the capacitive touch screen.

shown in FIG. 1 to FIG. 6 record difference value variations of a capacitive touch screen before and after water-entry. FIG. 7 records difference value variations of nodes on a capacitive touch screen after contact by a human body.

The difference values are obtained as follows: detecting data of the nodes on the capacitive touch screen absolutely in the air, and using the data of a previous frame of the capacitive touch screen during the detection as reference data; and detecting data of the nodes on the capacitive touch screen that partially or totally enters water, extracting one frame of data at each stage of the water-entry process and making a difference between the frame of data with the reference data to obtain difference values of the nodes at different stages during the water-entry process.

Figure 1:
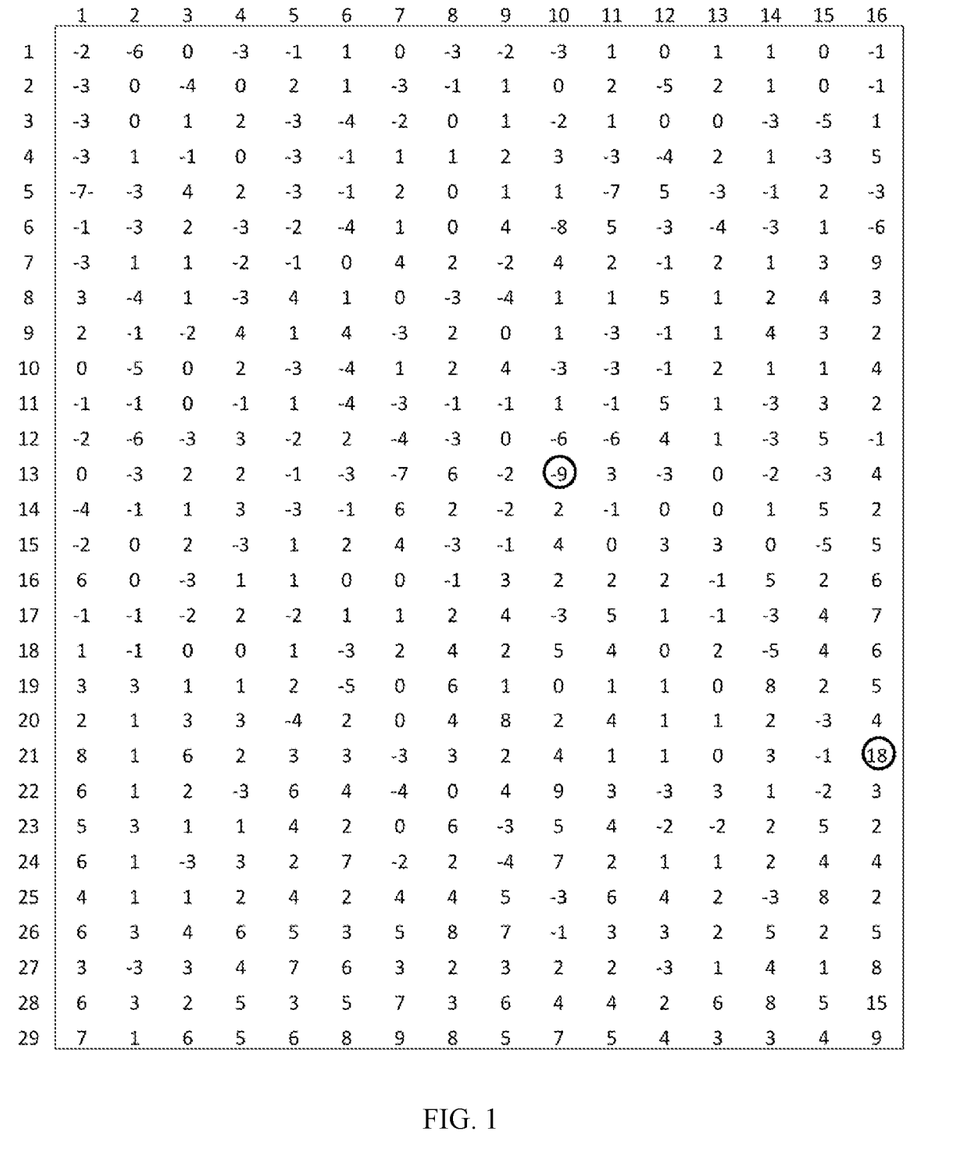

Referring to FIG. 1, one frame of data is selected from the detected data of the nodes when a capacitive touch screen is absolutely in the air, and the selected frame of data is used as the reference data.

As seen from FIG. 1, when the capacitive touch screen is absolutely in the air, the data of the nodes is between 9 and 18. The difference values in FIG. 2 to FIG. 7 are processed as follows: if the difference value of a node is greater than or equal to 50, it is considered that the node of the capacitive touch screen senses a contact with a water flow and mark the difference value of the node, that is, any of the line regions in FIG. 2 to FIG. 7.

Figure 2:
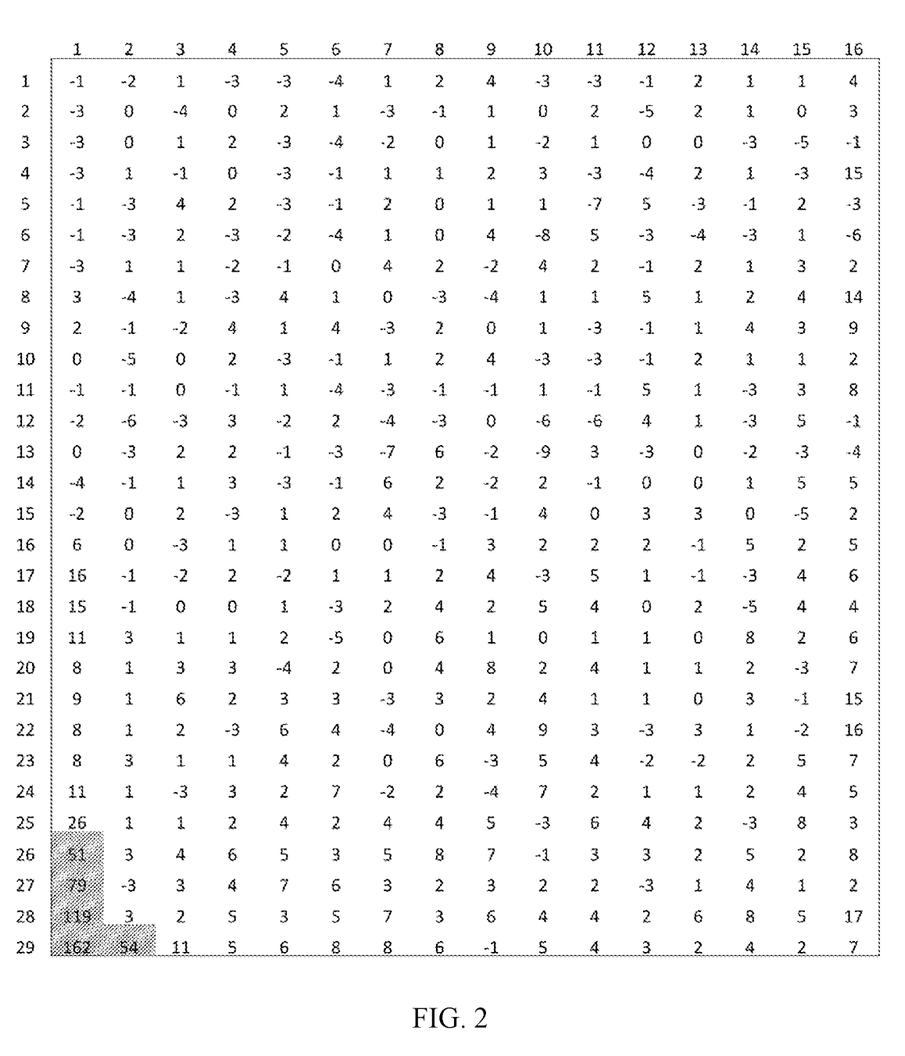

Referring to FIG. 2, the nodes whose difference values are greater than or equal to 50 are marked when a capacitive touch screen just begins entering the water. As seen from FIG. 2, the corner of the capacitive touch screen is firstly contacted with water, that is, the line region at the lower left corner in FIG. 2.

Figure 3:
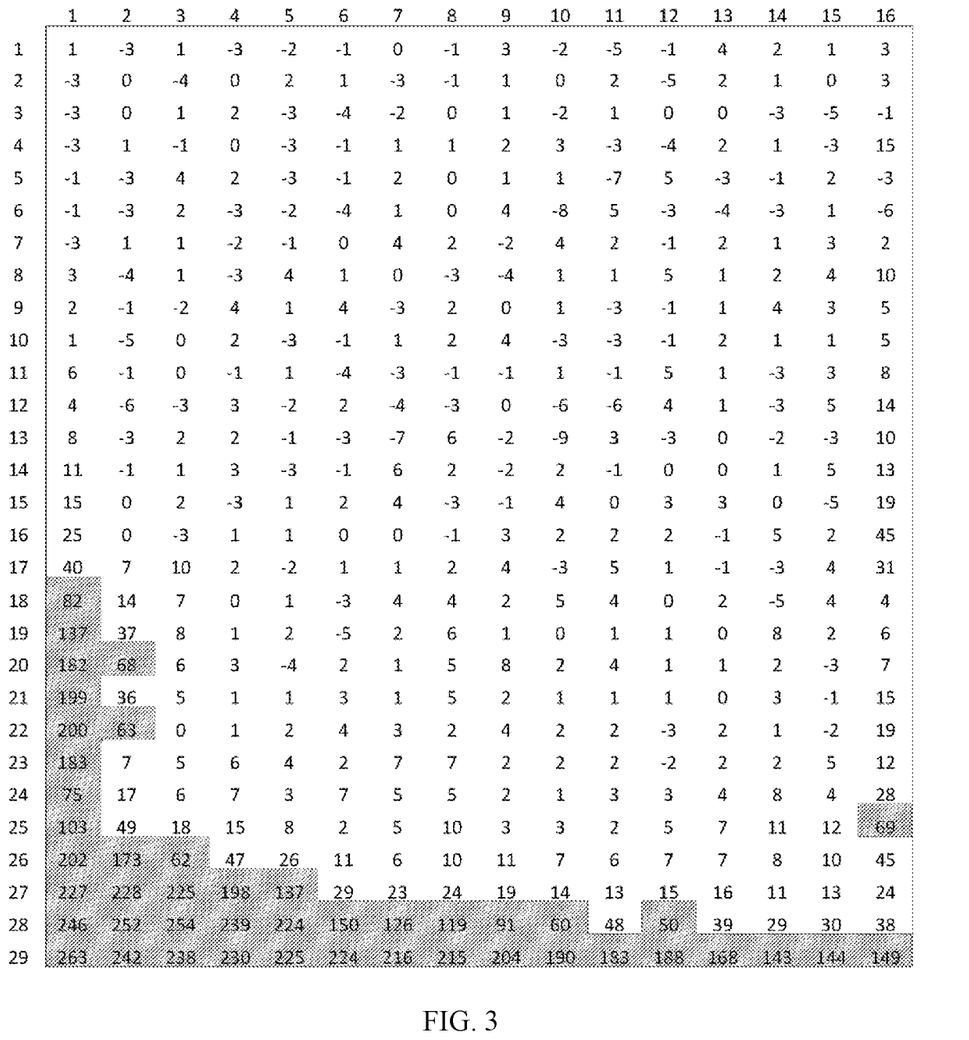
Figure 4:
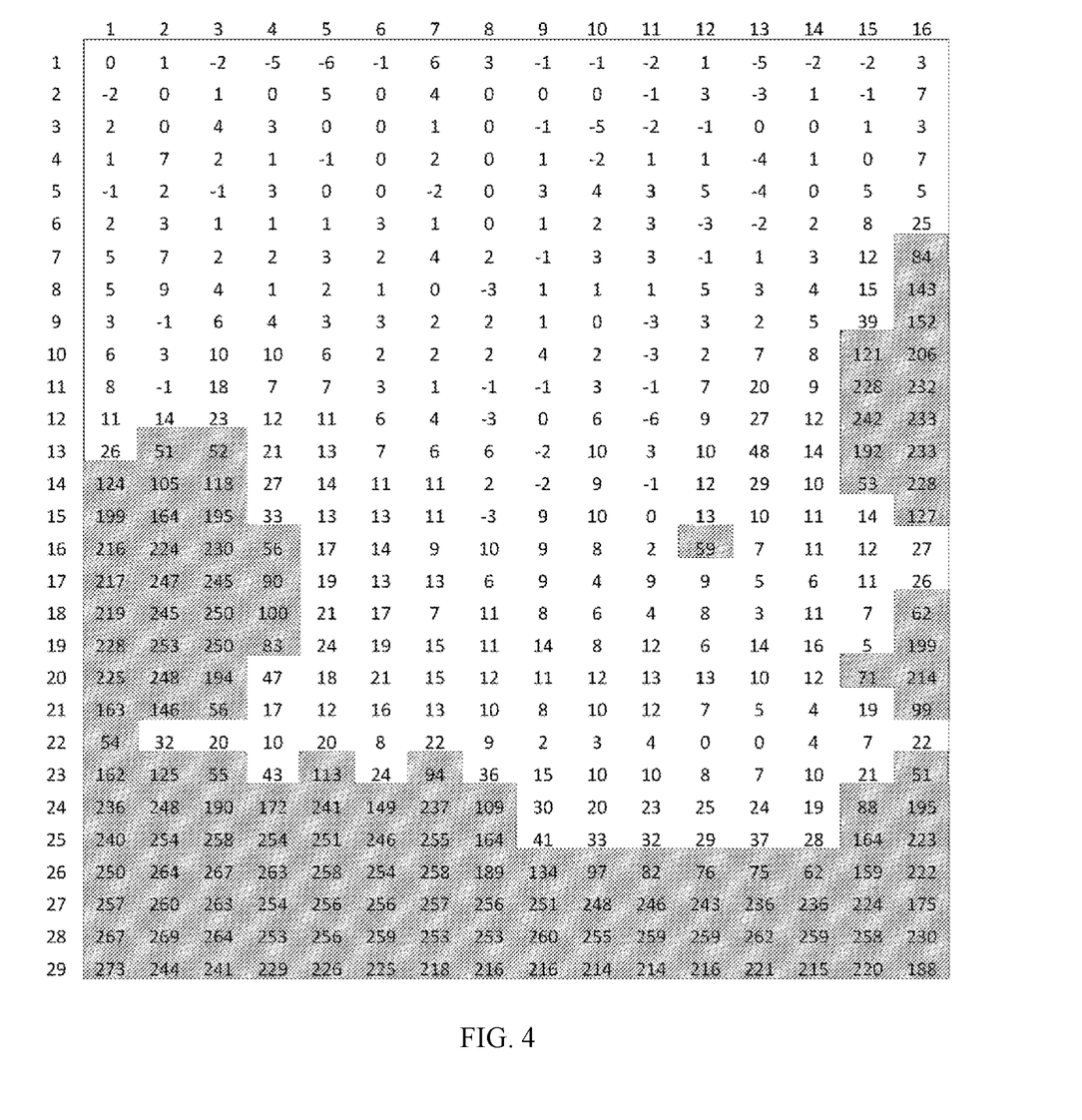

Referring to FIG. 3, the nodes whose difference values are greater than or equal to 50 are marked when a capacitive touch screen partially enters water. As seen from FIG. 3, the region in contact with the water flow that is sensed by the nodes on the capacitive touch screen extends from the region at the lower left corner in FIG. 6.

Referring to FIG. 3 to FIG. 6, the nodes whose difference values are greater than or equal to 50 are marked when a capacitive touch screen partially enters water. As seen from FIG. 3 to FIG. 6, the regions in contact with the water flow that are sensed by the nodes on the capacitive touch screen are constantly extending, which reflects the water-entry process of the capacitive touch screen.

Referring to FIG. 7, in the course where the user operates the capacitive capacitor, in normal cases, the finger is only in contact with a partial region of the capacitive touch screen.

As seen from FIG. 7, the regions in contact with human body that are sensed by the nodes on the capacitive touch screen are spot-wise distributed irregularly.

During practice of the present disclosure, the inventors have concluded through repeated experiments or tests that: When terminals such as mobile terminals and the like that are equipped with a touch screen fall into water, with respect to the touch screen, any of four corners of the touch screen may usually enter the water firstly. The regions in contact with the water flow that are sensed by the nodes on the capacitive touch screen are constantly extending, which reflects the water-entry process of the capacitive touch screen. During use of the terminals such as the mobile terminal and the like that are equipped with a touch screen, users' contacts with the touch screen are random and spot-wise distributed.

Based on the above teachings, the inventors have practiced the following embodiments.

Figure 8:
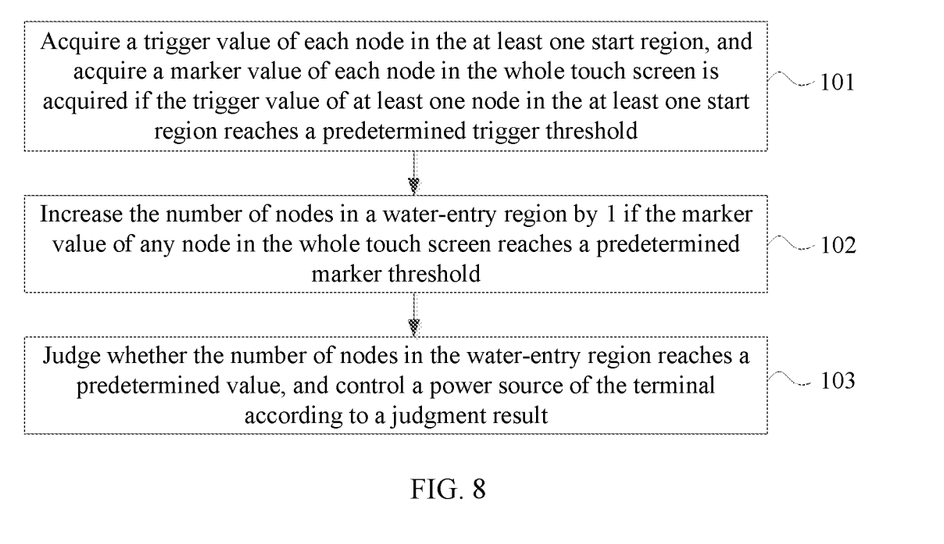
FIG. 8 is a flowchart of a terminal water-entry protection method according to one embodiment of the present disclosure.

Referring to FIG. 8, FIG. 8 is a flowchart of a terminal water-entry protection method according to one embodiment of the present disclosure. The terminal water-entry protection method is applied to smart phones, tablet computers and the like terminals that are equipped with a touch screen.

A touch region of the touch screen of the terminal has at least one start region, wherein the at least one start region includes at least one node. The number of start regions, the positions of the start regions, and the number of nodes included in each of the start regions may be defined before delivery of the terminal from factory, or may also be defined by users. The time and manner for defining the above parameters may not be used to interpret or limit the protection scope of the present disclosure.

The terminal water-entry protection method may include the following steps:

Step 101: A trigger value of each node in the at least one start region is acquired, and a marker value of each node in the whole touch screen is acquired if the trigger value of at least one node in the at least one start region reaches a predetermined trigger threshold.

Step 102: The number of nodes in a water-entry region is increased by one if the marker value of any node in the whole touch screen reaches a predetermined marker threshold.

Step 103: Whether the number of nodes in the water-entry region reaches a predetermined value is judged, and a power source of the terminal is controlled according to a judgment result.

In some embodiments of the present disclosure, if it is detected that the marker value of any node reaches the predetermined marker threshold, whether the node is adjacent to a node in the current water-entry region may be further judged, and if the node is adjacent to a node in the current water-entry region, the node is counted into the water-entry region, that is, the number of nodes in the water-entry region is increased by one.

In some embodiments of the present disclosure, the start region is respectively present in each of touch regions at four corners of the touch screen.

Figure 9:
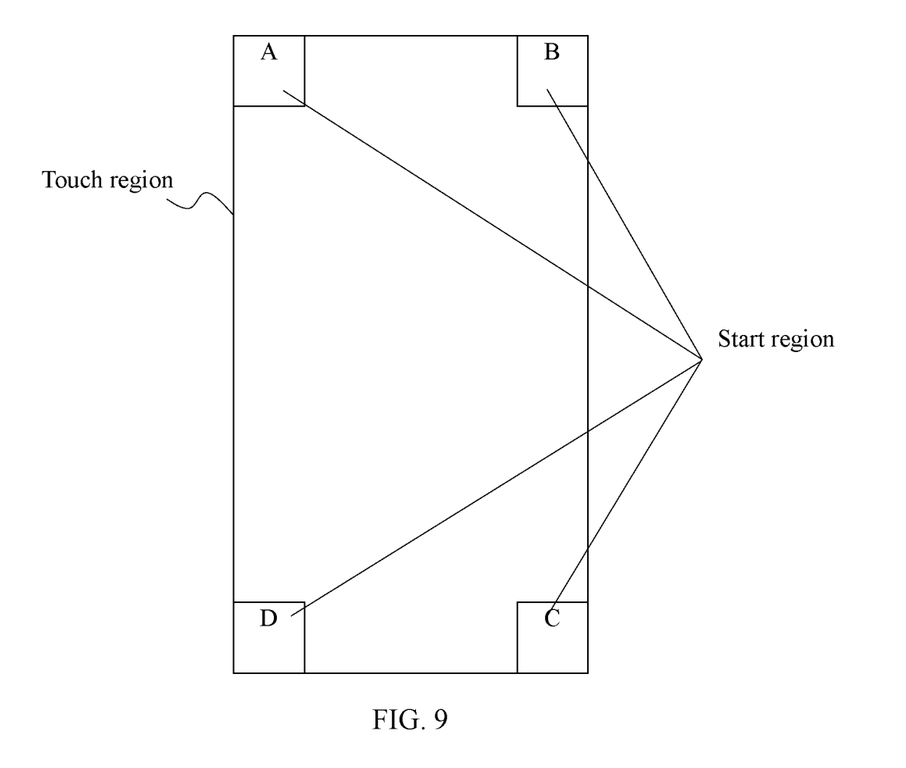
FIG. 9 is a schematic diagram of start regions present at four corners of a touch screen according to another embodiment of the present disclosure.

Referring to FIG. 9, FIG. 9 is a schematic diagram of start regions present at four corners of a touch screen according to another embodiment of the present disclosure. Start regions A, B, C and D are respectively present at four corners of the touch screen. The size on the touch screen that is occupied by each start region may be defined according to the actual needs.

For example, according to the size of the touch region of the touch screen and considering from the aspect of accurate sensing to set the size of the start regions.

Alternatively, the size may also be defined according to the waterproof performance of the terminal equipped with the touch screen. Assume that a charge interface, a data interface or an audio interface of a terminal is located on a side of a start region C and a start region D of the touch screen of the terminal, since the charge interface, the data interface and the audio interface are easily subject to water, the sizes of the start region C and the start region D may be adaptively increased. For example, the start region C extends towards the direction of the start region D, and thus the area occupied by the start region C in the touch region is increased. The start region D extends towards the direction of the start region C, and thus the area occupied by the start region D in the touch region is increased.

In some embodiments of the present disclosure, the acquiring a trigger value of each node in the at least one start region in step 101 includes: using a measurement value of each node in the at least one start region when the touch screen is in the air as a reference value of each node in the at least start region; constantly acquiring measurement value of each node in the at least one start region; and constantly calculating a difference value between the measurement value of each node in the at least one start region and the reference value of each node in the at least one start region, and using the difference value as the trigger value.

In some embodiments of the present disclosure, the acquiring a marker value of each node in the whole touch screen in step 101 includes: using the measurement value of each node in the whole touch screen when the touch screen is in the air as a reference value of each node in the whole touch screen; constantly acquiring a measurement value of each node in the whole touch screen; and constantly calculating a difference value between the measurement value of each node in the whole touch screen and the reference value of each node in the whole touch region, and using the difference value as the marker value.

In some embodiments of the present disclosure, the acquiring a trigger value of each node in the at least one start region in step 101 includes: constantly acquiring capacitance value or current value of each node in the at least one start region; and processing the capacitance value or current value of each node in the at least one start region to acquire the trigger value of each node in the at least one start region.

In some embodiments of the present disclosure, the acquiring a marker value of each node in the whole touch screen in step 101 includes: constantly acquiring a capacitance value/current of each node in the whole touch screen; and processing the capacitance value or current value of each node in the whole touch screen to acquire the marker value of each node in the whole touch screen.

In some embodiments of the present disclosure, the controlling a power source of the terminal according to a judgment result in step 103 includes: cutting off the power source of the terminal if the number of nodes in the water-entry region reaches the predetermined value.

In some embodiments of the present disclosure, the measurement value is acquired by processing the capacitance value or current value of each node.

In the above embodiments of the present disclosure, a touch region of the touch screen of the terminal has at least one start region, wherein the at least one start region has at least one node. Accordingly, water-entry protection may be timely triggered for the terminal. The terminal firstly acquires a trigger value of each node in the at least one start region, and acquires a marker value of each node in the whole touch screen if the trigger value of at least one node in the at least one start region reaches a predetermined trigger threshold. The number of nodes in a water-entry region is increased by one if the marker value of any node in the whole touch screen reaches a predetermined marker threshold. The terminal judges whether the number of nodes in the water-entry region reaches a predetermined value, and controls a power source of the terminal according to a judgment result. Accordingly, according to the embodiments of the present disclosure, the power source of the entire device may be cut off before entry into water, thereby protecting elements inside the device.

Figure 10:
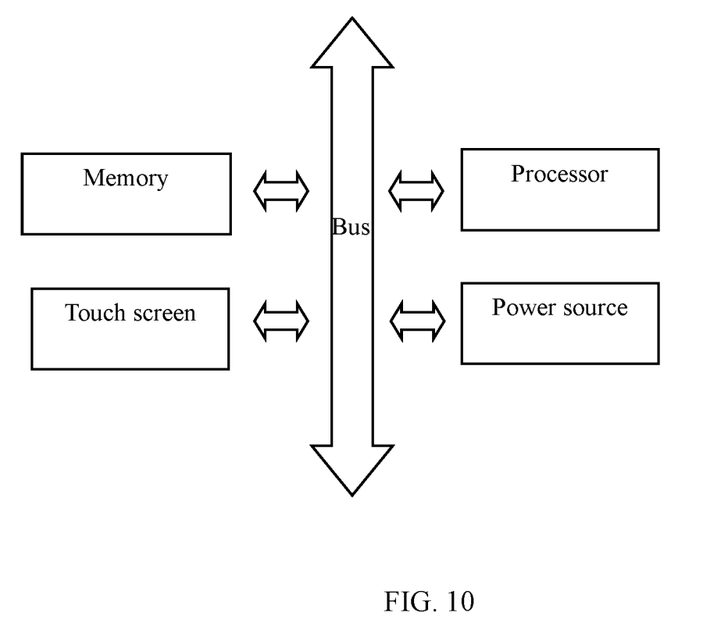
FIG. 10 is a schematic structural diagram of an electronic device according to still another embodiment of the present disclosure.

Referring to FIG. 10, FIG. 10 is a schematic structural diagram of an electronic device according to still another embodiment of the present disclosure. The electronic device is equipped with a touch screen; wherein a touch region of the touch screen has at least one start region, wherein the at least one start region having at least one node.

The electronic device includes at least one processor and at least one memory; wherein the at least one processor is communicably connected to the at least one memory.

The at least one memory stores instructions executable by the at least one processor, which, when being executed, cause the at least one processor to: acquire a trigger value of each node in the at least one start region, and acquire a marker value of each node in the whole touch screen if the trigger value of at least one node in the at least one start region reaches a predetermined trigger threshold; increase the number of nodes in a water-entry region by one if the marker value of any node in the whole touch screen reaches a predetermined marker threshold; judge whether the number of nodes in the water-entry region reaches a predetermined value; and control a power source of the terminal according to a judgment result.

In some embodiments of the present disclosure, the at least one processor is further configured to: use a measurement value of each node in the at least one start region when the touch screen is in the air as a reference value of each node in the at least start region; constantly acquire measurement value of each node in the at least one start region; and constantly calculate a difference value between the measurement value of each node in the at least one start region and the reference value of each node in the at least one start region, and use the difference value as the trigger value.

In some embodiments of the present disclosure, the at least one processor is further configured to: use the measurement value of each node in the whole touch screen when the touch screen is in the air as a reference value of each node in the whole touch screen; constantly acquire a measurement value of each node in the whole touch screen; and constantly calculate a difference value between the measurement value of each node in the whole touch screen and the reference value of each node in the whole touch region, and use the difference value as the marker value.

In some embodiments of the present disclosure, the at least one processor is further configured to: constantly acquire capacitance value or current value of each node in the at least one start region; and process the capacitance value or current value of each node in the at least one start region to acquire the trigger value of each node in the at least one start region.

In some embodiments of the present disclosure, the at least one processor is further configured to: constantly acquire a capacitance value/current of each node in the whole touch screen; and process the capacitance value or current value of each node in the whole touch screen to acquire the marker value of each node in the whole touch screen.

In some embodiments of the present disclosure, the at least one processor is configured to execute an instruction for cutting off a power source of the electronic device if the number of nodes in the water-entry region reaches a predetermined value.

In the above embodiments of the present disclosure, the at least one process is configured to: acquire a trigger value of each node in the at least one start region, and acquire a marker value of each node in the whole touch screen if the trigger value of at least one node in the at least one start region reaches a predetermined trigger threshold; increase the number of nodes in a water-entry region by one if the marker value of any node in the whole touch screen reaches a predetermined marker threshold; judge whether the number of nodes in the water-entry region reaches a predetermined value; and control a power source of the terminal according to a judgment result. Accordingly, the electronic device according to the embodiments of the present disclosure may cut off the power source of the entire device before entry into water, thereby protecting elements inside the device.

Another embodiment of the present disclosure further provides a non-transitory (non-volatile) computer storage medium, wherein the computer storage medium stores computer executable instructions, which may be executed to perform the terminal water-entry protection method in any of the above method embodiments.

Persons of ordinary skill in the art should understand that the terminal water-entry protection method, the non-transitory (non-volatile) computer storage medium and the electronic device may also be practiced in other ways.

In case of practice using software, computer-executable instructions and/or data for practicing the above various embodiments may be stored in a computer-readable medium or may be transferred as one or a plurality of instructions or code on the readable medium. The computer-readable medium includes a computer storage medium and a communication medium. The communication medium includes any medium capable of transferring a computer program from one location to another. The storage medium may be any available medium that may be stored in a computer. Exemplarily but not limitedly, the computer-readable medium may include a RAM, a ROM, an EEPROM, a CD-ROM or other optical disc storages, a magnetic disk storage medium or other magnetic storage devices, or any other mediums that are capable of carrying or storing desired program code having instructions or data structures and being accessible by a computer. In addition, any connection may be adaptively used as a computer-readable medium. For example, if the software is transferred from a website, a server or other remote sources using a coaxial cable, a twisted pair, a digital subscriber line (DSL) or other radio technologies such as infrared, radio and microwave, the coaxial cable, the twisted pair, the DSL or the other radio technologies such as infrared, radio and microwave are included in the mediums as defined above.

It should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of the technical features contained therein. Such modifications or replacement, made without departing from the principles of the present disclosure, shall fall within the scope of the present disclosure.

What is claimed is:

1. A terminal water-entry protection method, comprising:
arranging at least one start region in a touch region of a touch screen of a terminal, wherein the start region comprises at least one node;
acquiring a trigger value of each node in the at least one start region, and acquiring a marker value of each node in the whole touch screen in response to the trigger value of at least one node in the at least one start region reaching a predetermined trigger threshold;
increasing the number of nodes in a water-entry region by one for each instance of the marker value of any node in the whole touch screen reaching a predetermined marker threshold;
obtaining a judgement result in response to the number of nodes in the water-entry region reaching a predetermined value; and
cutting off a power source of the terminal in response to the judgment result.

2. The terminal water-entry protection method according to claim 1, wherein the acquiring a trigger value of each node in the at least one start region comprises:
using a measurement value of each node in the at least one start region when the touch screen is in the air as a reference value of each node in the at least start region;
constantly acquiring measurement value of each node in the at least one start region; and
constantly calculating a difference value between the measurement value of each node in the at least one start region and the reference value of each node in the at least one start region, and using the difference value as the trigger value.

3. The terminal water-entry protection method according to claim 2, wherein the acquiring a marker value of each node in the whole touch screen comprises:
using the measurement value of each node in the whole touch screen when the touch screen is in the air as a reference value of each node in the whole touch screen;
constantly acquiring a measurement value of each node in the whole touch screen; and
constantly calculating a difference value between the measurement value of each node in the whole touch screen and the reference value of each node in the whole touch region, and using the difference value as the marker value.

4. The terminal water-entry protection method according to claim 1, wherein the acquiring a trigger value of each node in the at least one start region comprises:
constantly acquiring a capacitance value or a current value of each node in the at least one start region; and
processing the capacitance value or current value of each node in the at least one start region to acquire the trigger value of each node in the at least one start region.

5. The terminal water-entry protection method according to claim 4, wherein the acquiring a marker value of each node in the whole touch screen comprises:
constantly acquiring a capacitance value or a current value of each node in the whole touch screen; and
processing the capacitance value or the current value of each node in the whole touch screen to acquire the marker value of each node in the whole touch screen.

6. The terminal water-entry protection method according to claim 1, wherein the start region is respectively present in each of touch regions at four corners of the touch screen.

7. An electronic device, equipped with a touch screen; wherein a touch region of the touch screen comprises at least one start region, the at least one start region comprises at least one node; and
the electronic device comprises at least one processor and at least one memory;
wherein the at least one processor is communicably connected to the at least one memory; and
the at least one memory stores instructions executable by the at least one processor, which, when being executed, cause the at least one processor to:
acquire a trigger value of each node in the at least one start region, and acquire a marker value of each node in the whole touch screen in response to the trigger value of at least one node in the at least one start region reaching a predetermined trigger threshold;
increase the number of nodes in a water-entry region by one for each instance of the marker value of any node in the whole touch screen reaching a predetermined marker threshold;
obtain a judgement result in response to the number of nodes in the water-entry region reaching a predetermined value; and
cut off a power source of the terminal in response to the judgment result.

8. The electronic device according to claim 7, wherein the at least one processor is further configured to:
use a measurement value of each node in the at least one start region when the touch screen is in the air as a reference value of each node in the at least start region;
constantly acquire measurement value of each node in the at least one start region; and
constantly calculate a difference value between the measurement value of each node in the at least one start region and the reference value of each node in the at least one start region, and use the difference value as the trigger value.

9. The electronic device according to claim 8, wherein the at least one processor is further configured to:

use the measurement value of each node in the whole touch screen when the touch screen is in the air as a reference value of each node in the whole touch screen;
constantly acquire a measurement value of each node in the whole touch screen; and
constantly calculate a difference value between the measurement value of each node in the whole touch screen and the reference value of each node in the whole touch region, and use the difference value as the marker value.

10. The electronic device according to claim 7, wherein the at least one processor is further configured to:
constantly acquire capacitance value or current value of each node in the at least one start region; and
process the capacitance value or current value of each node in the at least one start region to acquire the trigger value of each node in the at least one start region.

11. The electronic device according to claim 10, wherein the at least one processor is further configured to:
constantly acquire a capacitance value or a current value of each node in the whole touch screen; and
process the capacitance value or the current value of each node in the whole touch screen to acquire the marker value of each node in the whole touch screen.

12. A non-transitory computer-readable medium with instructions stored therein, the instructions, when executed by a processor, cause the processor to perform operations, the operations comprising:
arranging at least one start region in a touch region of a touch screen of a terminal, wherein the start region comprises at least one node; acquiring a trigger value of each node in the at least one start region, and
acquiring a marker value of each node in the whole touch screen in response to the trigger value of at least one node in the at least one start region reaching a predetermined trigger threshold;
increasing the number of nodes in a water-entry region by one for each instance the marker value of any node in the whole touch screen reaching a predetermined marker threshold;
obtaining a judgement result in response to the number of nodes in the water-entry region reaching a predetermined value; and
cutting-off a power source of the terminal in response to the judgment result.

13. The non-transitory computer-readable medium according to claim 12, wherein the acquiring a trigger value of each node in the at least one start region comprises:
using a measurement value of each node in the at least one start region when the touch screen is in the air as a reference value of each node in the at least start region;
constantly acquiring measurement value of each node in the at least one start region; and
constantly calculating a difference value between the measurement value of each node in the at least one start region and the reference value of each node in the at least one start region, and using the difference value as the trigger value.

14. The non-transitory computer-readable medium according to claim 13, wherein the acquiring a marker value of each node in the whole touch screen comprises:
using the measurement value of each node in the whole touch screen when the touch screen is in the air as a reference value of each node in the whole touch screen;
constantly acquiring a measurement value of each node in the whole touch screen; and
constantly calculating a difference value between the measurement value of each node in the whole touch screen and the reference value of each node in the whole touch region, and using the difference value as the marker value.

15. The non-transitory computer-readable medium according to claim 12, wherein the acquiring a trigger value of each node in the at least one start region comprises:
constantly acquiring a capacitance value or a current value of each node in the at least one start region; and
processing the capacitance value or current value of each node in the at least one start region to acquire the trigger value of each node in the at least one start region.

16. The non-transitory computer-readable medium according to claim 15, wherein the acquiring a marker value of each node in the whole touch screen comprises:
constantly acquiring a capacitance value or a current value of each node in the whole touch screen; and
processing the capacitance value or the current value of each node in the whole touch screen to acquire the marker value of each node in the whole touch screen.

17. The non-transitory computer-readable medium according to claim 12, wherein the start region is respectively present in each of touch regions at four corners of the touch screen.

* * * * *

UNITED STATES PATENT AND TRADEMARK OFFICE
CERTIFICATE OF CORRECTION

Page 1 of 1

PATENT NO. : 11,079,299 B2
APPLICATION NO. : 15/879704
DATED : August 3, 2021
INVENTOR(S) : Ping Zhang It is certified that error appears in the above-identified patent and that said Letters Patent is hereby corrected as shown below:

On the Title Page

Item (73), please change "Shenzhen Goodix Technology Co., LTD" to "Shenzhen Goodix Technology Co., LTD."

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*